(12) United States Patent
Maki et al.

(10) Patent No.: US 9,206,327 B2
(45) Date of Patent: Dec. 8, 2015

(54) NONAQUEOUS INK COMPOSITION FOR INK JET RECORDING AND INK JET RECORDING METHOD USING NONAQUEOUS INK COMPOSITION

(75) Inventors: Ito Maki, Nagano (JP); Akihito Sao, Matsumoto (JP); Kazumasa Tomura, Kodaira (JP); Kenichiro Kubota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 340 days.

(21) Appl. No.: 13/432,239

(22) Filed: Mar. 28, 2012

(65) Prior Publication Data

US 2012/0249666 A1 Oct. 4, 2012

(30) Foreign Application Priority Data

Mar. 29, 2011 (JP) ................................. 2011-073581

(51) Int. Cl.
| | |
|---|---|
| *B41J 2/01* | (2006.01) |
| *C09D 11/36* | (2014.01) |
| *B41J 2/015* | (2006.01) |
| *C09D 11/30* | (2014.01) |
| *C09D 11/322* | (2014.01) |

(52) U.S. Cl.
CPC . *C09D 11/36* (2013.01); *B41J 2/01* (2013.01); *B41J 2/015* (2013.01); *C09D 11/30* (2013.01); *C09D 11/322* (2013.01)

(58) Field of Classification Search
CPC ............ B41J 2/01; B41J 2/015; C09D 11/30; C09D 11/322; C09D 11/36; C09D 11/38
USPC .......... 347/95–100; 523/160, 161; 106/31.13, 106/31.27, 31.6
See application file for complete search history.

(56) References Cited

U.S. PATENT DOCUMENTS

| | | | |
|---|---|---|---|
| 2005/0090581 A1 | 4/2005 | Oyanagi | |
| 2007/0070158 A1* | 3/2007 | Sakasai | ......................... 347/100 |
| 2008/0145628 A1 | 6/2008 | Oyanagi et al. | |
| 2008/0173214 A1* | 7/2008 | Oyanagi et al. | ............ 106/31.25 |
| 2008/0213518 A1* | 9/2008 | Oyanagi et al. | .............. 428/34.1 |
| 2010/0029813 A1* | 2/2010 | Deroover et al. | ............... 524/93 |
| 2010/0289859 A1 | 11/2010 | Oyanagi et al. | |
| 2011/0025783 A1 | 2/2011 | Oyanagi et al. | |

FOREIGN PATENT DOCUMENTS

| | | | | |
|---|---|---|---|---|
| JP | 2005-068250 A | | 3/2005 | |
| JP | 2005-068251 A | | 3/2005 | |
| JP | 2005068252 A | | 3/2005 | |
| JP | 2007-146002 A | | 6/2007 | |
| JP | 2007-169451 A | | 7/2007 | |
| JP | 2008174712 A | | 7/2008 | |
| JP | 2010-121141 A | | 6/2010 | |
| JP | 2010-168411 A | | 8/2010 | |
| JP | 2010-180332 A | | 8/2010 | |
| JP | 2010180332 A | * | 8/2010 | ............. C09D 11/00 |
| JP | 2010-209333 A | | 9/2010 | |
| JP | 2010-265422 A | | 11/2010 | |

\* cited by examiner

*Primary Examiner* — Matthew Luu
*Assistant Examiner* — Rut Patel
(74) *Attorney, Agent, or Firm* — Nutter McClennen & Fish LLP; John J. Penny, Jr.

(57) ABSTRACT

A nonaqueous ink composition for ink jet recording contains a glitter pigment and a solvent represented by the following formula:

$$R^1\!-\!O\!-\!CH_2\!-\!CH_2\!-\!C(=\!O)\!-\!N(R^2)(R^3) \qquad (1)$$

wherein $R^1$ represents an alkyl group containing one to eight carbon atoms and $R^2$ and $R^3$ represent a methyl group or an ethyl group.

9 Claims, No Drawings

NONAQUEOUS INK COMPOSITION FOR INK JET RECORDING AND INK JET RECORDING METHOD USING NONAQUEOUS INK COMPOSITION

The entire disclosure of Japanese Application No.: 2011-073581 filed on Mar. 29, 2011 is expressly incorporated by reference herein.

BACKGROUND

1. Technical Field

The present invention relates to a nonaqueous ink composition for ink jet recording and an ink jet recording method using the nonaqueous ink composition.

2. Related Art

The following processes have been conventionally used to record images having a metallic gloss on recording media: the application of ink containing a golden or silvery powder prepared from brass, aluminum, or silver particles; hot-stamping using a metal foil; and a thermal transfer process.

In recent years, many applications for ink jet printing have been seen. One of the applications is metallic printing. For example, JP-A-2008-174712 discloses an aluminum pigment dispersion containing an organic solvent such as an alkylene glycol and a nonaqueous ink composition containing the aluminum pigment dispersion.

However, in the case of recording a metallic image on a recording medium using a nonaqueous ink composition containing a conventional pigment (hereinafter simply referred to as "metal pigment") made of a metal such as aluminum, most of an organic solvent contained in the nonaqueous ink composition permeates the recording medium or evaporates and therefore is hardly present on a surface of the recording medium. Thus, the metal pigment is exposed on the recording medium surface. Since the metal pigment has poor fixability to the recording medium, there is a problem in that the metallic image has poor abrasion resistance.

Furthermore, the nonaqueous ink composition, which contains the conventional pigment, has a problem with storage stability because the metal pigment aggregates during long-term storage to cause quality deterioration. After the nonaqueous ink composition is deteriorated in storage stability, any good metallic image cannot be obtained and it is difficult to eject the nonaqueous ink composition from a recording head of an ink jet printer.

SUMMARY

The invention has been made to solve at least one of the above problems. An aspect of the invention provides a nonaqueous ink composition, useful in obtaining a record having a metallic image excellent in abrasion resistance, for ink jet recording. Another aspect of the invention provides an ink jet recording method using the nonaqueous ink composition.

Another aspect of the invention provides a nonaqueous ink composition for ink jet recording. The nonaqueous ink composition is useful in obtaining a record having a metallic image excellent in abrasion resistance and has excellent long-term storage stability. Another aspect of the invention provides an ink jet recording method using the nonaqueous ink composition.

The invention can be embodied in the form of applications below.

Application 1

An embodiment of the invention provides a nonaqueous ink composition for ink jet recording. The nonaqueous ink composition contains a glitter pigment and a solvent represented by the following formula:

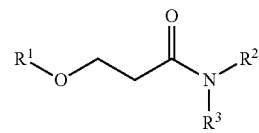

(1)

wherein $R^1$ represents an alkyl group containing one to eight carbon atoms and $R^2$ and $R^3$ represent a methyl group or an ethyl group.

The nonaqueous ink composition specified in Application 1 contains the solvent represented by Formula (1) and therefore is useful in obtaining a record having a metallic image excellent in abrasion resistance using a recording medium containing, for example, a vinyl chloride resin or the like.

Application 2

In the nonaqueous ink composition specified in Application 1, the glitter pigment may be made of aluminum or an aluminum alloy.

Application 3

The nonaqueous ink composition specified in Application 1 or 2 may further contain an alicyclic saturated hydrocarbon.

When the nonaqueous ink composition specified in Application 3 further contain the alicyclic saturated hydrocarbon, the nonaqueous ink composition specified therein is useful in obtaining a record having a metallic image excellent in abrasion resistance using a recording medium containing, for example, a vinyl chloride resin or the like and has good long-term storage stability.

Application 4

In the nonaqueous ink composition specified in Application 3, the alicyclic saturated hydrocarbon may contain eight to 12 carbon atoms.

Application 5

In the nonaqueous ink composition specified in Application 3, the alicyclic saturated hydrocarbon may be at least one selected from the group consisting of cyclooctane, cyclononane, cyclodecane, cycloundecane, and cyclododecane.

Application 6

An ink jet recording method according to an embodiment of the invention includes ejecting droplets of the nonaqueous ink composition specified in any one of Applications 1 to 5 and applying the droplets to a recording medium to record an image on the recording medium.

According to the ink jet recording method specified in Application 6, the nonaqueous ink composition is used and therefore a record having a metallic image excellent in abrasion resistance can be obtained using a recording medium containing, for example, a vinyl chloride resin or the like.

DESCRIPTION OF EXEMPLARY EMBODIMENTS

Preferred embodiments of the invention will now be described in detail. The embodiments are for exemplification. The invention is not limited to the embodiments and includes various modifications made within the scope of the invention.

1. Nonaqueous Ink Composition for Ink Jet Recording

A nonaqueous ink composition (hereinafter simply referred to as "nonaqueous ink composition") for ink jet recording according to an embodiment of the invention contains a glitter pigment and a specific solvent below. The term "nonaqueous ink composition" as used herein means that water is not intentionally added in the course of producing an ink composition. The ink composition may contain a slight amount of water, which is trapped therein during production or storage.

Components used in this embodiment are described below in detail.

1.1. Solvent

The nonaqueous ink composition contains a solvent represented by the following formula:

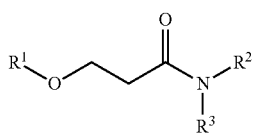

(1)

wherein $R^1$ is an alkyl group containing one to eight carbon atoms and $R^2$ and $R^3$ are a methyl group or an ethyl group.

The alkyl group containing one to eight carbon atoms may be a linear or branched alkyl group such as a methyl group, an ethyl group, an n-propyl group, an iso-propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, or a tert-octyl group. The solvent represented by Formula (1) is excellent in compatibility with resins such as vinyl chloride resins. Therefore, the nonaqueous ink composition, which contains the solvent represented by Formula (1), interacts with a recording medium containing a resin such as a vinyl chloride resin and therefore has increased fixability to the recording medium. This allows the abrasion resistance of the glitter pigment present on the recording medium to be increased.

The solvent represented by Formula (1) preferably has an HLB of 8.0 to 20.0, more preferably 8.5 to 18.5, and particularly preferably 12.0 to 18.5. When the HLB of the solvent represented by Formula (1) is within the above range, the solvent represented by Formula (1) has good fixability to resins. The term "HLB" as used herein refers to the value calculated from the ratio (hereinafter simply referred to as "I/O value") of an inorganic value (I) to organic value (O) in the organic conceptual diagram by the following equation:

$$HLB = (\text{inorganic value}(I)/\text{organic value}(O)) \times 10 \quad (2).$$

In particular, the I/O value can be calculated in accordance with a document such as Atsushi Fujita, *Keitouteki Yuuki Teisei Bunseki (Kongoubuttsu Hen)*, Kazamashobo, 1974; Nobuhiko Kuroki, *Senshoku Riron Kagaku*, Maki Shoten, 1966; or Hiroo Inoue, *Yuuki Kagoubutsu Bunrihou*, Shokabo, 1990.

The content of the solvent represented by Formula (1) in the nonaqueous ink composition is preferably 2% to 50% by weight and more preferably 5% to 50% by weight. When the content of the solvent represented by Formula (1) is within the above range, the nonaqueous ink composition has increased fixability to recording media because of the interaction with resins such as vinyl chloride resins and therefore the abrasion resistance of the glitter pigment present on the recording media can be increased. Furthermore, the nonaqueous ink composition has good compatibility with an alicyclic saturated hydrocarbon below and also has increased stability.

1.2. Glitter Pigment

The nonaqueous ink composition contains the glitter pigment. The glitter pigment may be one capable of being ejected by an ink jet recording method in the form of ink droplets. The glitter pigment has a function of imparting glitter to the nonaqueous ink composition when the nonaqueous ink composition is attached to a recording medium. The glitter pigment is, for example, a pearl pigment or a metal pigment. Examples of the pearl pigment include pigments, such as titanium oxide-coated mica, argentine, and bismuth oxychloride, having a pearl gloss or an interference gloss. Examples of the metal pigment include particles of aluminum, particles of silver, particles of gold, particles of platinum, particles of nickel, particles of chromium, particles of tin, particles of zinc, particles of indium, and particles of copper. One of these metals or at least one selected from the group consisting of alloys of these metals and mixtures of these metals can be used.

From the viewpoint of glossiness and cost, the glitter pigment is preferably made of aluminum or an aluminum alloy. In the case of using the aluminum alloy, a metal or nonmetal element added to aluminum is not particularly limited and preferably has a gloss. Examples of the metal element include silver, gold, platinum, nickel, chromium, tin, zinc, indium, titanium, and copper. At least one of these metal elements can be used.

The solvent represented by Formula (1) and the alicyclic saturated hydrocarbon, which are contained in the nonaqueous ink composition, have low reactivity with metals and therefore the glitter pigment need not be surface-treated.

When the glitter pigment contains substantially spherical particles, the glitter pigment preferably has a 50% average particle size (d50) of 0.8 µm to 1.2 µm in terms of spheres as determined by light scattering.

The term "50% average particle size (d50) in terms of spheres as determined by light scattering" as used herein refers to the value obtained as described below. The diffracted/scattered light generated by applying light to particles in a dispersion medium is measured with a detector placed in front of, beside, or behind the dispersion medium. An accumulation curve is created by setting the volume of a group of the particles to 100% using obtained measurements in such a manner that the particles are converted into spheres equal in volume to the particles on the assumption that the particles, which are actually irregular, are spherical. The 50% point on the accumulation curve is defined as the 50% average particle size (d50) in terms of spheres as determined by light scattering. A measurement system used is, for example, a laser diffraction-scattering particle size distribution analyzer, LMS-2000e, available from Seishin Enterprise Co., Ltd. When the 50% average particle size (d50) in terms of spheres as determined by light scattering is within the above range, an image with high glitter can be recorded on a recording medium and the stability of the nonaqueous ink composition ejected from a nozzle is good.

The glitter pigment used in this embodiment preferably contains tabular particles. The term "tabular particles" as used herein refers to particles having a substantially flat surface (X-Y plane) and substantially uniform thickness (Z). The term "substantially flat surface" as used herein refers to a surface of each tabular particle that has the maximum projected area.

The term "equivalent circle diameter" as used herein refers to the diameter of a circle with the same area as the projected area of the substantially flat surface (X-Y plane) of the tabular particle.

From the viewpoint of glitter and ejection stability, the 50% average particle size (R50) calculated as the equivalent circle diameter determined from the area of the X-Y plane of the tabular particle is preferably 0.5 μm to 3 μm and more preferably 0.75 μm to 2. When the 50% average particle size (R50) is less than 0.5 μm, glitter tends to be insufficient. When the 50% average particle size (R50) is more than 3 μm, recording stability tends to be low.

The longitudinal size X, lateral size Y, and equivalent circle diameter of the tabular particle can be measured with a particle image analyzer. The particle image analyzer may be, for example, a flow particle image analyzer, FPIA-2100, FPIA-3000, or FPIA-3000S, available from Sysmex Corporation.

The particle size distribution (CV) of the glitter pigment can be determined by the following equation:

$$CV = (\text{standard deviation of particle size distribution} / \text{average particle size}) \times 100 \qquad (3).$$

The CV determined by this equation is preferably 60 or less, more preferably 50 or less, and particularly preferably 40 or less. The effect of enhancing recording stability can be obtained in such a manner that the glitter pigment is selected so as to have a CV of 60 or less.

From the viewpoint of achieving high glitter, the relationship between the 50% average particle size (R50) calculated as the equivalent circle diameter and the thickness Z preferably satisfies the inequality R50/Z>5. When the value of the term R50/Z is five or less, glitter tends to be insufficient. The thickness Z can be measured with a transmission or scanning electron microscope, of which examples include a transmission electron microscope, JEM-2000EX, available from JOEL Ltd. and an field emission-scanning electron microscope, S-4700, available from Hitachi, Ltd. The term "thickness Z" as used herein refers to the average thickness, that is, the average of ten measurements obtained as described above.

From the viewpoint of preventing ink from causing clogging in ink jet recording apparatuses, the maximum particle size Rmax calculated as the equivalent circle diameter determined from the area of the X-Y plane of the tabular particle is preferably 10 μm or less. When the maximum particle size Rmax is 10 μm or less, nozzles of ink jet recording apparatuses and mesh filters placed in ink channels can be prevented from being clogged.

A method for producing the glitter pigment is as follows: for example, a composite pigment precursor having a configuration in which a strippable resin layer and a metal or alloy layer are arranged on a sheet-shaped base in that order is prepared and the metal or alloy layer is stripped from the sheet-shaped base with the strippable resin layer used as a boundary and is then finely pulverized into the tabular particles. Those having a 50% average particle size (R50) of 0.5 μm to 3 μm and satisfying the inequality R50/Z>5 are separated from the obtained tabular particles, where the 50% average particle size (R50) is calculated as the equivalent circle diameter determined from the area of the X-Y plane of each tabular particle; X and Y are the longitudinal size and lateral size, respectively, of a flat surface of the tabular particle; and Z is the thickness of the tabular particle.

The metal or alloy layer is preferably formed by vacuum vapor deposition, ion plating, or sputtering.

The metal or alloy layer preferably has a thickness of 5 nm to 100 nm and more preferably 20 nm to 100 nm. This allows that the tabular particles preferably have an average thickness of 5 nm to 100 nm and more preferably 20 nm to 100 nm. When the average thickness thereof is 5 nm or more, the tabular particles are excellent in reflectivity and glitter and the performance of the glitter pigment is high. When the average thickness thereof is 100 nm or less, the increase in apparent density of the glitter pigment can be, suppressed and the dispersion stability of the glitter pigment can be secured.

In the composite pigment precursor, the strippable resin layer serves as an undercoat for the metal or alloy layer and is used to readily strip the metal or alloy layer from the sheet-shaped base. Preferred examples of a resin used to form the strippable resin layer include polyvinyl alcohol, polyvinyl butyral, polyethylene glycol, polyacrylic acid, polyacrylic amide, cellulose derivatives such as cellulose acetate butyrate, acrylic polymers, and modified nylon resins. A solution containing one or more of these materials is applied to the sheet-shaped base and is then dried, whereby the strippable resin layer is formed. The solution may contain an additive such as a viscosity modifier.

The strippable resin layer may be formed by a commonly known process such as a gravure coating process, a roll coating process, a blade coating process, an extrusion coating process, a dip coating process, or a spin coating process. After application and/or drying, the strippable resin layer may be surface-smoothed by calendering as required.

The thickness of the strippable resin layer is not particularly limited and is preferably 0.5 μm to 50 μm and more preferably 1 μm to 10 μm. When the thickness thereof is less than 0.5 the amount of a dispersible resin is insufficient. When the thickness thereof is more than 50 μm, the strippable resin layer is likely to be stripped from the metal or alloy layer when being rolled.

The sheet-shaped base is not particularly limited and may be a releasable film. Examples of the releasable film include polytetrafluoroethylene films, polyethylene films, polypropylene films, polyester films such as polyethylene terephthalate films, polyamide films such as nylon 66 films and nylon 6 films, polycarbonate films, triacetate films, and polyimide films. In particular, the sheet-shaped base is preferably made of polyethylene terephthalate or a copolymer thereof. The thickness of the sheet-shaped base is not particularly limited and is preferably 10 μm to 150 μm. When the thickness thereof is 10 μm or more, the sheet-shaped base has no problem with handling in production steps. When the thickness thereof is 150 μm or less, the sheet-shaped base is highly flexible and has no problem with rolling or releasing.

The metal or alloy layer may be sandwiched between protective layers as disclosed in JP-A-2005-68250. Examples of the protective layers include silicon oxide layers and protective resin layers.

The silicon dioxide layers are not particularly limited and may be those containing silicon oxide. The silicon oxide layers are preferably formed from a silicon alkoxide such as tetraalkoxysilane or a polymer thereof by a sol-gel process. In particular, the silicon oxide layers are formed in such a manner that a solution prepared by dissolving the silicon alkoxide or the polymer thereof in an alcohol is applied to the metal or alloy layer, is heated, and is then fired.

The protective resin layers are not particularly limited and may be made of a resin insoluble in a dispersion medium. Examples of such a resin include polyvinyl alcohol, polyethylene glycol, polyacrylic acid, polyacrylamide, and cellulose derivatives. In particular, the protective resin layers are preferably made of polyvinyl alcohol or a cellulose derivative such as cellulose acetate butyrate. An application solution containing one or more of these resins is applied to the metal or alloy layer and is then dried, whereby the protective resin layers are formed. The application solution may contain an additive such as a viscosity modifier.

The silicon oxide layers or the protective resin layers are formed by a process similar to that used to form the strippable resin layer.

The thickness of each protective resin layer is not particularly limited and is preferably 50 nm to 150 nm. When the thickness thereof is less than 50 nm, the protective resin layer has insufficient mechanical strength. When the thickness thereof is greater than 150 nm, the protective resin layer has extremely high strength; hence, it is difficult to crush and/or disperse the protective resin layer and the protective resin layer is stripped from the metal or alloy layer in some cases.

The composite pigment precursor may have a configuration having the strippable resin layer and a plurality of layered structures having metal or alloy layers and protective layers arranged in that order. In this case, the total thickness of the layered structures, that is, the thickness of a metal or alloy layer-strippable resin layer-metal or alloy layer . . . strippable resin layer-metal or alloy layer laminate excluding the sheet-shaped base and the strippable resin layer is preferably 5,000 nm or less. When the thickness thereof is 5,000 nm or less, the composite pigment precursor is hardly cracked or delaminated and is excellent in storage stability even in the case of rolling the composite pigment precursor into a roll. Furthermore, the composite pigment precursor can be processed into a preferable pigment with excellent glitter. The composite pigment precursor may have, but is not limited to, a configuration in which strippable resin layers and metal or alloy layers are arranged on two surfaces of the sheet-shaped base in that order.

Examples of a process for stripping the metal or alloy layer from the sheet-shaped base include, but are not limited to, a process in which a liquid (solvent) is sprayed onto the composite pigment precursor and the metal or alloy layer is scraped off from the composite pigment precursor, a process in which the composite pigment precursor is immersed in a liquid, a process in which the composite pigment precursor is immersed in a liquid and is ultrasonically treated in the liquid and thereby the metal or alloy layer is stripped and pulverized. In these processes, the liquids used for stripping can be recovered in addition to the stripped metal or alloy layer. Examples of a liquid (solvent) used for stripping include glycol ether solvents, lactone solvents, and mixtures of these solvents. A process for finely pulverizing the stripped metal or alloy layer is not particularly limited. The stripped metal or alloy layer may be finely pulverized by a known process using a ball mill, a bead mill, an ultrasonic mill, a jet mill, or the like.

The glitter pigment is obtained as described above. The strippable resin layer acts as a protective colloid and therefore a stable dispersion can be obtained only by dispersing the glitter pigment in a solvent. In an ink containing the glitter pigment, a resin originating from the strippable resin layer has a function of imparting adhesion to a recording medium.

The content of the glitter pigment in the nonaqueous ink composition is preferably 0.5% to 2.0% by mass. When the content of the glitter pigment in the ink is 0.5% to less than 1.7% by mass, a half mirror-like glossy surface, that is, such a texture that exhibits gloss and a see-through background can be formed by ejecting the ink in an amount insufficient to cover a recording surface and a high-gloss glitter surface can be formed by ejecting the ink in an amount sufficient to cover a recording surface. Therefore, the ink is suitable for forming a half mirror-like image on, for example, a transparent recording medium and is suitable for expressing a high-gloss glitter surface. When the content of the glitter pigment in the ink is 1.7% to 2.0% by mass, a matte glitter surface can be formed because the glitter pigment are randomly arranged on a recording surface and therefore no high gloss is obtained. Therefore, the ink is suitable for forming a shielding layer on, for example, a transparent recording medium.

1.3. Alicyclic Saturated Hydrocarbon

The nonaqueous ink composition preferably further contains the alicyclic saturated hydrocarbon. When the alicyclic saturated hydrocarbon is contained therein, for example, the aggregation of the glitter pigment can be effectively suppressed and therefore good long-term storage stability can be achieved. Such an advantageous effect tends to be increased in the case of using the solvent represented by Formula (1) and the alicyclic saturated hydrocarbon in combination. The use of the solvent represented by Formula (1) and the alicyclic saturated hydrocarbon in combination tends to allow a metallic image recorded on a recording medium to have particularly increased abrasion resistance. The alicyclic saturated hydrocarbon has good compatibility with the solvent represented by Formula (1) and therefore the nonaqueous ink composition has increased stability.

The alicyclic saturated hydrocarbon may contain a substituent such as an alkyl group or a cycloalkyl group. Thus, the alicyclic saturated hydrocarbon is not limited to any cycloalkane having a single alicyclic structure and may be a bicycloalkane having two or more alicyclic structures or a hydrocarbon having a plurality of alicyclic structures.

The alicyclic saturated hydrocarbon preferably contains eight to 12 carbon atoms and more preferably eight to ten carbon atoms. When the number of carbon atoms in the alicyclic saturated hydrocarbon is within the above range, the storage stability of the nonaqueous ink composition is good and the viscosity of the nonaqueous ink composition can be secured well; hence, the ejection stability of ink jet printers is good. When the alicyclic saturated hydrocarbon contains more than 12 carbon atoms, the alicyclic saturated hydrocarbon has an increased molecular weight and therefore the nonaqueous ink composition has an increased viscosity; hence, the ejection stability of ink jet printers may possibly be impaired.

From the viewpoint of the storage stability and ejection stability of the nonaqueous ink composition and the compatibility with the solvent represented by Formula (I), the alicyclic saturated hydrocarbon is preferably cyclooctane, monomethylcyclooctane, ethylcyclooctane, propylcyclooctane, dimethylcyclooctane, ethylmethylcyclooctane, cyclononane, methylcyclononane, ethylcyclononane, dimethylcyclononane, cyclodecane, methylcyclodecane, cycloundecane, or cyclododecane. Among these hydrocarbons, preferred are cyclooctane, cyclononane, cyclodecane, cycloundecane, and cyclodocane and particularly preferred are cyclooctane, cyclononane, and cyclodecane.

The alicyclic saturated hydrocarbon, which may be contained in the nonaqueous ink composition, preferably has a boiling point of 150° C. or higher and more preferably 180° C. or higher at atmospheric pressure.

The content of the alicyclic saturated hydrocarbon in the nonaqueous ink composition is preferably 5% to 30% by mass and more preferably 10% to 25% by mass. When the content of the alicyclic saturated hydrocarbon is within the above range, for example, the aggregation of the glitter pigment can be effectively suppressed. Therefore, good long-term storage stability is likely to be achieved. The alicyclic saturated hydrocarbon has good compatibility with the solvent represented by Formula (I) and the nonaqueous ink composition has increased stability.

1.4. Other Additives

The nonaqueous ink composition may further contain an organic solvent, resin, and/or the like in addition to the solvent represented by Formula (I) and the alicyclic saturated hydrocarbon as required.

1.4.1. Other Organic Solvents

From the viewpoint of increasing the fixability of metallic images to recording media, the nonaqueous ink composition preferably contains at least one selected from the group consisting of alkylene glycol ethers and lactones that are liquid at room temperature and atmospheric pressure and more preferably contains an alkylene glycol ether.

Examples of the alkylene glycol ethers include ethylene glycol ethers and propylene glycol ethers containing an aliphatic group such as a methyl group, an n-propyl group, an i-propyl group, an n-butyl group, an i-butyl group, a hexyl group, or a 2-ethylhexyl group or a group, such as an allyl group or a phenyl group, having a double bond. The alkylene glycol ethers are colorless, smell slightly, contain an ether group and a hydroxyl group, therefore have properties common to alcohols and ethers, and are liquid at room temperature and atmospheric pressure. Other examples of the alkylene glycol ethers include alkylene glycol monoethers each containing a single substituent derived from a hydroxyl group and alkylene glycol diethers each containing two substituents derived from hydroxyl groups. These ethers can be used in combination.

Examples of the alkylene glycol monoethers include ethylene glycol monomethyl ether, ethylene glycol monoethyl ether, ethylene glycol mono-iso-propyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The lactones are preferably lactones containing six or less carbon atoms and more preferably β-propiolactone, β-butyrolactone, γ-butyrolactone, γ-valerolactone, and ε-caprolactone.

The alkylene glycol ethers and the lactones, which may be contained in the nonaqueous ink composition, preferably have a boiling point of 150° C. or higher and more preferably 180° C. or higher at atmospheric pressure.

The alkylene glycol ethers, which may be contained in the nonaqueous ink composition, preferably have a vapor pressure of 1 hPa or less and more preferably 0.7 hPa or less at 20° C.

The use of an alkylene glycol ether satisfying requirements such as high boiling point and low vapor pressure as described above eliminates the installation of a local ventilation system or a waste gas treatment system, enables the improvement of working environment, and allows the environmental load to surroundings to be reduced.

The nonaqueous ink composition preferably contains at least one selected from the group consisting of the alkylene glycol ethers and the lactones as described above. The content of at least one selected from the group consisting of the alkylene glycol ethers and the lactones in the nonaqueous ink composition is preferably 30% to 90% by mass.

The nonaqueous ink composition may further contain an organic solvent below in addition to at least one of the exemplified organic solvents.

This organic solvent is preferably polar. Examples of this organic solvent include alcohols such as methanol, ethanol, propanol, butanol, and fluoroalcohols; ketones such as acetone, methyl ethyl ketone, and cyclohexanone; carboxylic esters such as methyl acetate, ethyl acetate, propyl acetate, butyl acetate, methyl propionate, and ethyl propionate; and ethers such as diethyl ether, dipropyl ether, tetrahydrofuran, and dioxane.

1.4.2. Resin

From the viewpoint of increasing the fixability of metallic images to recording media, the nonaqueous ink composition may further contain resin. Examples of the resin include acrylic resins, styrene-acrylic resins, rosin-modified resins, terpene resins, polyesters, polyamides, epoxy resins, vinyl chloride resins, vinyl chloride-vinyl acetate copolymers, cellulose resins such as cellulose acetate butyrate and hydroxypropyl cellulose, polyvinyl butyral, polyacrylic polyols, polyvinyl alcohols, and polyurethanes.

Among these resins, preferred is at least one selected from the group consisting of polyvinyl butyral, cellulose acetate butyrate, and the polyacrylic polyols and more preferred is cellulose acetate butyrate. Such a preferred configuration is capable of obtaining advantageous effects such as good abrasion resistance during drying, high fixability, and high glitter.

The resin may be made from a non-aqueous dispersion (NAD) containing polymer particles. The non-aqueous dispersion is a dispersion in which particles of a polyurethane resin, an acrylic resin, an acrylic polyol resin, or the like are stably dispersed in an organic solvent. Examples of the polyurethane resin include SANPRENE IB-501 and SANPRENE IB-F370 both available from Sanyo Chemical Industries, Ltd. Examples of the acrylic polyol resin include N-2043-60MEX and N-2043-AF-1 both available from Harima Chemicals, Inc.

The content of the resin in the nonaqueous ink composition is preferably 0.1% to 10% by mass.

1.4.3. Other Additives

The nonaqueous ink composition preferably further contains at least one or more of glycerin, a polyalkylene glycol, and a sugar. The content of one or more of glycerin, the polyalkylene glycol, and the sugar in the nonaqueous ink composition is preferably 0.1% to 10% by mass. Such a preferred configuration can suppress the drying of ink, can prevent clogging, can stabilize the ejection of ink, and can enhance the image quality of a record.

The polyalkylene glycol is a linear polymeric compound with a main chain having repeating ether units and is produced by, for example, the ring-opening polymerization of a cyclic ether or the like.

Examples of the polyalkylene glycol include polymers such as polyethylene glycol and polypropylene glycol, ethylene oxide-propylene oxide copolymers, and derivatives thereof. The ethylene oxide-propylene oxide copolymers may be random copolymers, block copolymers, graft copolymers, or alternating copolymers.

A preferred example of the polyalkylene glycol is a compound represented by the following formula:

$$HO—(C_nH_{2n}O)_m—H \quad (4)$$

wherein n represents an integer of 1 to 5 and m represents an integer of 1 to 100.

In Formula (4), the term $(C_nH_{2n}O)_m$ may be expressed with a certain number or a combination of two or more numbers within the range of the integer n. When n is, for example, 3, the term $(C_nH_{2n}O)_m$ is expressed as $(C_3H_6O)_m$. When n is a combination of 1 and 4, the term $(C_nH_{2n}O)_m$ is expressed as $(CH_2O—C_4H_8)_m$. The integer m may be a certain number or a combination of two or more numbers within the range thereof. When m is, for example, a combination of 20 and 40, the term $(C_nH_{2n}O)_m$ is expressed as $(CH_2O)_{20}—(C_2H_4O)_{40}$. When m is, for example, a combination of 10 and 30, the term $(C_nH_{2n}O)_m$ is expressed as $(CH_2O)_{10}—(C_4H_8O)_{30}$. The integers n and m may be arbitrarily combined within the above ranges.

Examples of the sugar include monosaccharides such as pentose, hexose, heptose, and octose; polysaccharides such as disaccharides, trisaccharides, and tetrasaccharides; sugar alcohols derived from these saccharides; reduced derivatives such as deoxy acids; oxidized derivatives such as aldonic acids and uronic acids; dehydrated derivatives such as glycoseen; amino acids; and thiosugars. The term "polysaccharide" as used herein refers to sugar in a broad sense and includes substances, such as alginic acid, dextrin, and cellulose, widely present in nature.

The nonaqueous ink composition may further contain a surfactant. The surfactant is, for example, an acetylene glycol surfactant. Examples of the acetylene glycol surfactant include 2,4,7,9-tetramethyl-5-decyne-4,7-diol; 3,6-dimethyl-4-octyne-3,6-diol; 3,5-dimethyl-1-hexyne-3-ol; commercial products, such as Surfynol 104, Surfynol 82, Surfynol 465, Surfynol 485, and Surfynol TG, available from Air Products and Chemicals, Inc.; commercial products, such as Olfine STG and Olfine E1010, available from Nissin Chemical Industry Co., Ltd.; commercial products, such as Nissan Nonion A-10R and Nissan Nonion A-13R, available from NOF Corporation; commercial products, such as Flowlen TG-740W and Flowlen D-90, available from Kyoeisha Chemical Co., Ltd.; commercial products, such as Emulgen A-90 and Emulgen A-60, available from Kao Corporation; and commercial products, such as Noigen CX-100, available from Dai-ichi Kogyo Seiyaku Co., Ltd. These polyoxyethylene derivatives may be used alone or in combination. Each surfactant imparts anti-volatility to ink to suppress the evaporation of the ink in a tube for supplying the ink from an ink cartridge to a print head and therefore the deposition of a solid in the tube can be prevented or suppressed.

The surfactant may be a nonionic polyoxyethylene derivative that is liquid at room temperature and atmospheric pressure. Examples of the nonionic polyoxyethylene derivative include polyoxyethylene alkyl ethers, polyoxyethylene alkylphenol ethers, sorbitan monoesters, and polyoxyethylene sorbitan monoesters. Examples of the polyoxyethylene alkyl ethers include polyoxyethylene cetyl ethers, such as Nissan Nonion P-208, available from NOF Corporation; polyoxyethylene oleyl ethers, such as Nissan Nonion E-202S and Nissan Nonion E-205S, available from NOF Corporation; and polyoxyethylene lauryl ethers, such as Emulgen 106 and Emulgen 108, available from Kao Corporation. Examples of the polyoxyethylene alkylphenol ethers include polyoxyethylene octylphenol ethers, such as Nissan Nonion HS-204, Nissan Nonion HS-205, Nissan Nonion HS-206, and Nissan Nonion HS-208, available from NOF Corporation. Examples of the sorbitan monoesters include sorbitan monocaprylates, such as Nissan Nonion CP-08R, available from NOF Corporation and sorbitan monolaurates, such as Nissan Nonion LP-20R, available from NOF Corporation. Examples of the polyoxyethylene sorbitan monoesters include polyoxyethylene sorbitan monostearates, such as Nissan Nonion OT-221, available from NOF Corporation; polycarboxylic polymeric activators, such as Flowlen G-70, available from Kyoeisha Chemical Co., Ltd.; polyoxyethylene higher alcohol ethers, such as Emulgen 707 and Emulgen 709, available from Kao Corporation; tetraglycerin oleate, such as Poem J-4581, available from Riken Vitamin Co., Ltd.; nonylphenol ethoxylates, such as Adeka Tol NP-620, Adeka Tol NP-650, Adeka Tol NP-660, Adeka Tol NP-675, Adeka Tol NP-683, and Adeka Tol NP-686, available from Adeka Corporation; aliphatic phosphates, such as Adeka Col CS-141E and Adeka Col TS-230E, available from Adeka Corporation; sorbitan sesquioleates, such as Solgen 30, available from Dai-ichi Kogyo Seiyaku Co., Ltd.; sorbitan monooleates, such as Solgen 40, available from Dai-ichi Kogyo Seiyaku Co., Ltd.; polyethylene glycol sorbitan monolaurates, such as Solgen TW-20, available from Dai-ichi Kogyo Seiyaku Co., Ltd.; and polyethylene glycol sorbitan monooleates, such as Solgen TW-80, available from Dai-ichi Kogyo Seiyaku Co., Ltd.

1.4.4. Method for Producing Nonaqueous Ink Composition

The nonaqueous ink composition can be produced by a known conventional method and is particularly produced as described above. The above glitter pigment, a dispersant, and a portion of the solvent represented by Formula (1) are mixed into a pigment dispersion using a ball mill, a bead mill, an ultrasonic mill, a jet mill, or the like. The pigment dispersion is adjusted so as to have desired ink properties. The rest of the solvent represented by Formula (1) and other additives such as resin and a surfactant are added to the pigment dispersion under stirring, whereby the nonaqueous ink composition can be obtained.

After a composite pigment dispersion is prepared by ultrasonically treating the composite pigment precursor in the solvent represented by Formula (1), the composite pigment dispersion may be mixed with a necessary ink solvent. Alternatively, the nonaqueous ink composition can be produced in such a manner that the composite pigment precursor is ultrasonically treated directly in an ink solvent. A known technique such as pressure filtration or centrifugal separation can be used to adjust the solid concentration of the nonaqueous ink composition.

1.4.5. Properties

From the viewpoint of the balance between the quality of prints and the reliability of an ink composition for ink jet recording, the nonaqueous ink composition preferably has an surface tension of 20 mN/m to 50 mN/m and more preferably 25 mN/m to 40 mN/m at 20° C. The surface tension thereof can be measured in such a manner that the nonaqueous ink composition is applied to a platinum plate and is checked for surface tension with an automatic surface tensiometer, CBVP-Z, available from Kyowa Interface Science Co., Ltd.

From the same viewpoint, the nonaqueous ink composition preferably has a viscosity of 2 mPa·s to 8 mPa·s and more preferably 2 mPa·s to 5.5 mPa·s at 20° C. The viscosity thereof can be measured in such a manner that the shear rate thereof is increased from 10 to 1,000 at 20° C. using a rheometer, MCR-300, available from Physica and the viscosity is read at a shear rate of 200.

2. Ink Jet Recording Method

An ink jet recording method according to an embodiment of the invention is characterized in that an image is recorded on a recording medium in such a manner that droplets of the nonaqueous ink composition are ejected and are applied to a surface of the recording medium. The ink jet recording method uses the nonaqueous ink composition and therefore a record having a high-quality metallic image with excellent abrasion resistance can be obtained using a recording medium containing, for example, a vinyl chloride resin.

The nonaqueous ink composition contains the solvent represented by Formula (1) as described above and this solvent tends to interact with the vinyl chloride resin. Therefore, the ink jet recording method is excellent in that the metallic image is tightly fixed on the recording medium containing the vinyl chloride resin because the metallic image is recorded by applying droplets of the nonaqueous ink composition to the recording medium containing the vinyl chloride resin.

From the above viewpoint, a recording medium used in this method preferably contains resin such as a vinyl chloride resin. Examples of the recording medium containing the vinyl chloride resin include hard and soft vinyl chloride films and hard and soft vinyl chloride sheets. The nonaqueous ink composition can be used to record an image on an untreated surface of a vinyl chloride resin base and therefore has an advantageous effect that any expensive recording medium such as a conventional recording medium including a receiving layer is not necessary. The nonaqueous ink composition can be used for surface-treated bases including ink-receiving layers.

An ink jet recording apparatus used in the ink jet recording method is not particularly limited and is preferably of a drop-on-demand type ink jet recording apparatus. Examples of the drop-on-demand type ink jet recording apparatus include apparatuses using a piezoelectric element-recording method in which piezoelectric elements arranged in a recording head are used for recording and apparatuses using a thermal jet recording method in which thermal energy generated from heaters of heat-generating resistive elements arranged in a recording head is used for recording. Both of these recording methods can be used. The nonaqueous ink composition has an advantage that the nonaqueous ink composition is inactive against an ink-repellent surface of an ejection nozzle. Therefore, the nonaqueous ink composition can be advantageously used in the ink jet recording method in such a manner that the nonaqueous ink composition is ejected from an ink jet recording head including ejection nozzles having ink-repellent surfaces.

3. Examples

The invention is further described below in detail with reference to examples. The invention is not limited to the examples. In the examples and comparative examples, all percentages are on a mass basis unless otherwise specified.

3.1. Preparation of Glitter Pigment Dispersion

The following solution was uniformly applied onto a PET film with a thickness of 100 μm by a bar coating process: a resin coating solution containing 3.0% cellulose acetate butyrate, having a butyryl content of 35% to 39%, available from Kanto Chemical Co., Inc. and 97% diethylene glycol diethyl ether available from Nippon Nyukazai Co., Ltd. The PET film was dried at 60° C. for ten minutes, whereby a thin resin layer was formed on the PET film.

An aluminum layer with an average thickness of 20 nm was formed on the resin layer by vapor deposition using a vacuum evaporator, VE-1010, available from Vacuum Device Inc.

A laminate formed by the above procedure was stripped, finely pulverized, and dispersed in diethylene glycol diethyl ether in one step using an ultrasonic disperser, VS-150, available from As One Corporation, whereby a glitter pigment dispersion with a cumulative ultrasonic dispersion time of 12 hours was prepared.

The glitter pigment dispersion was filtered through a SUS mesh filter with 5 μm openings, whereby coarse particles were removed from the glitter pigment dispersion. The filtrate was poured into a round-bottomed flask and diethylene glycol diethyl ether was distilled from the filtrate using a rotary evaporator. This allowed the glitter pigment dispersion to be concentrated. The concentration of the glitter pigment dispersion was adjusted to 5%.

A glitter pigment obtained from the glitter pigment dispersion was measured for particle size using a flow particle image analyzer, FPIA-3000S, available from Sysmex Corporation, resulting in that the 50% average particle size R50 and maximum particle size Rmax calculated as the equivalent circle diameter of the longitudinal size (X-direction)-lateral size (Y-direction) plane of the glitter pigment were 1.03 μm and 4.9 μm, respectively. The glitter pigment was measured for thickness using a transmission electron microscope, JEM-2000EX, available from JOEL Ltd., resulting in that the average thickness Z (the average of ten measurements) of the glitter pigment was 0.02 μm. The ratio R50/Z was 51.5 as calculated from measurements of R50 and Z. The particle size distribution (CV) of the glitter pigment was 44.0 as determined by the equation CV (standard deviation of particle size distribution/average particle size)×100.

3.2. Synthesis of Solvents 3.2.1. Solvent A

Into a 300 mL separable flask equipped with a stirrer, a thermocouple, and a nitrogen gas inlet tube, 19.828 g N,N-dimethylacrylamide and 6.408 g methanol were put, followed by stirring under nitrogen. To the mixture, 0.338 g sodium t-butoxide was added, followed by reaction at 35° C. for four hours. After heating was turned off, 150 mg phosphoric acid was added to the reaction mixture, whereby a solution was obtained. The solution was homogenized and was then left for three hours. The solution was filtered, whereby precipitates were removed therefrom. Furthermore, unreacted reagents were removed from the solution with an evaporator, whereby Solvent A represented by the following formula was obtained:

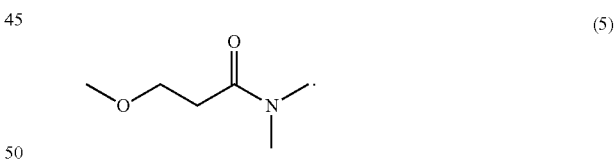

(5)

The HLB of Solvent A was 18.3 as calculated from the I/O value in the organic conceptual diagram by Equation (2).

3.2.2. Solvent B

Into a 300 mL separable flask equipped with a stirrer, a thermocouple, and a nitrogen gas inlet tube, 19.828 g N,N-dimethylacrylamide and 14.824 g 1-butanol were put, followed by stirring under nitrogen. To the mixture, 0.338 g sodium t-butoxide was added, followed by reaction at 35° C. for four hours. After heating was turned off, 150 mg phosphoric acid was added to the reaction mixture, whereby a solution was obtained. The solution was homogenized and was then left for three hours. The solution was filtered, whereby precipitates were removed therefrom. Furthermore, unreacted reagents were removed from the solution with an evaporator, whereby Solvent B represented by the following formula was obtained:

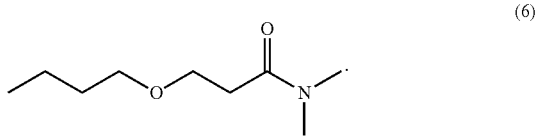

(6)

The HLB of Solvent B was 12.2 as calculated from the I/O value in the organic conceptual diagram by Equation (2).

3.2.3. Solvent C

Into a 300 mL separable flask equipped with a stirrer, a thermocouple, and a nitrogen gas inlet tube, 25.441 g N,N-dimethylacrylamide and 6.408 g methanol were put, followed by stirring under nitrogen. To the mixture, 0.338 g sodium t-butoxide was added, followed by reaction at 35° C. for four hours. After heating was turned off, 150 mg phosphoric acid was added to the reaction mixture, whereby a solution was obtained. The solution was homogenized and was then left for three hours. The solution was filtered, whereby precipitates were removed therefrom. Furthermore, unreacted reagents were removed from the solution with an evaporator, whereby Solvent C represented by the following formula was obtained:

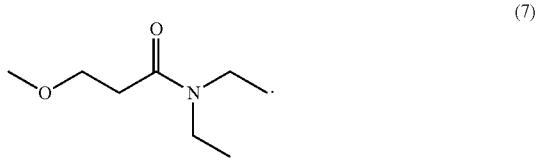

(7)

The HLB of Solvent C was 13.8 as calculated from the I/O value in the organic conceptual diagram by Equation (2).

3.3. Preparation of Nonaqueous Ink Compositions

Nonaqueous ink compositions containing components shown in Tables 1 and 2 were prepared using the glitter pigment dispersion prepared as described above (values in these tables are on a mass percent basis). In particular, solvents and additives were mixed and dissolved, whereby ink solvents were prepared. The glitter pigment dispersion was added to each ink solvent, followed by mixing and stirring at room temperature and atmospheric pressure for 30 minutes with a magnetic stirrer, whereby a corresponding one of the nonaqueous ink compositions was prepared.

Materials shown in Tables 1 and 2 were as described below.

γ-butyrolactone available from Kanto Chemical Co., Inc.

N-methylpyrrolidone available from Wako Pure Chemical Industries, Ltd.

2-pyrrolidone available from Wako Pure Chemical Industries, Ltd.

Diethylene glycol diethyl ether available from Nippon Nyukazai Co., Ltd.

Tetraethylene glycol dimethyl ether available from Nippon Nyukazai Co., Ltd.

Cyclooctane available from Wako Pure Chemical Industries, Ltd.

Cyclononane available from Honest Joy Holdings, Limited

Cyclodecane available from Tokyo Chemical Industry Co., Ltd.

Cyclododecane available from Tokyo Chemical Industry Co., Ltd.

Cellulose acetate butyrate, having a butyryl content of 35% to 39%, available from Across Organics.

3.4. Evaluation of Nonaqueous Ink Compositions 3.4.1. Abrasion Resistance of Records The following printer was used: an ink jet printer, SP-300V, available from J Roland DG, including a sheet guide section equipped with a temperature-variable heater. Each nonaqueous ink composition containing the glitter pigment prepared as described above was filled in a black column of the printer and a solid pattern was printed on an A4-sized print medium, SPVC-G-1270T, available from J Roland DG, for solvent inks at a density of 100% using the nonaqueous ink composition, the print medium being a glossy vinyl chloride sheet, whereby a record was obtained. For recording conditions, the heater of the printer was set to keep the temperature of a recording surface at 40° C. According to the printer, a record having a metallic image can be obtained in such a manner that droplets of the nonaqueous ink composition are ejected and are applied to a recording medium and the recording medium is moved through a heated print heater portion. The obtained record was left at room temperature, 25° C., for five hours in a laboratory.

The recording medium was evaluated for abrasion resistance in such a manner that a recording surface of the recording medium was rubbed with cotton cloth under a load of 200 g ten times using a Gakushin-type rubbing fastness tester, AB-301, available from Tester Sangyo Co., Ltd. and the peeling state of the recording surface and the state of ink transferred to the cotton cloth piece were checked. Evaluation standards are described below. The evaluation results are summarized in Tables 1 and 2. The evaluation standards "A" and "B" below are acceptable for practical use.

A: No ink peeling or ink transfer to cotton cloth is observed even after rubbing ten times.

B: Slight ink peeling or ink transfer to cotton cloth is observed after rubbing ten times.

C: Ink peeling or ink transfer to cotton cloth is observed after rubbing ten times.

3.4.2. Printer Ejection

As described in Item "3.4.1. Abrasion resistance of records", the ink jet printer, SP-300V, available from J Roland DG was used and each nonaqueous ink composition containing the glitter pigment prepared as determined was filled in a black column of the printer. Thereafter, a nozzle check pattern was printed, thereby confirming that the printer was free from filling failure or nozzle clogging. A solid pattern was printed on an A4-sized print medium, SPVC-G-1270T, available from J Roland DG, for solvent inks at a density of 100% using the nonaqueous ink composition, the print medium being a glossy vinyl chloride sheet. In this printing operation, the ejection of each nonaqueous ink composition was evaluated in accordance with evaluation standards below. The evaluation results are summarized in Tables 1 and 2. The evaluation standards "A" and "B" below are acceptable for practical use.

A: The temporary interruption of ejection or ejection failure occurs and is dissolved during printing and there is substantially no problem.

B: The temporary interruption of ejection or ejection failure occurs and is not dissolved during printing and normal ejection is recovered by maintenance.

C: The temporary interruption of ejection or ejection failure occurs, normal ejection cannot be performed, or ejection is not recovered by maintenance.

3.4.3. Storage Stability of Nonaqueous Ink Compositions

Each nonaqueous ink composition prepared as described above was filled in a bottle. After the bottle was hermetically sealed and was then sufficiently shaken, the nonaqueous ink composition was stored at room temperature and atmospheric pressure for six months. Six months later, the nonaqueous ink composition was tested as described below, whereby the nonaqueous ink composition was evaluated for storage stability.

(1) Viscosity of Nonaqueous Ink Compositions

The nonaqueous ink compositions shown in Tables 1 and 2 were measured for viscosity at 20° C. using a modular compact rheometer, Physica MCR 300, available from Anton-Paar before and after being stored. The viscosity was measured at 20° C. and a shear rate of 200 $s^{-1}$. The rate of change in viscosity was calculated by the following equation:

rate of change in viscosity(%)=(1−(viscosity of unstored nonaqueous ink composition/viscosity of stored nonaqueous ink composition))×100   (8).

The nonaqueous ink compositions were evaluated in accordance with evaluation standards below. The evaluation results are summarized in Tables 1 and 2. The standard "C" below is unsuitable for ejection.

A: A rate of change in viscosity of 6% or less.
B: A rate of change in viscosity of more than 6% to 9%.
C: A rate of change in viscosity of more than 9%.

(2) Measurement of Glossiness

Records each having a metallic image were prepared by a technique similar to that described in Item "3.4.1. Abrasion resistance of records" using the nonaqueous ink compositions stored for six months. The obtained images were measured for glossiness at 20° C. using a glossmeter, Multi Gloss 268, available from Konica Minolta Holdings, Inc. and were evaluate in accordance with evaluation standards below. The evaluation results are summarized in Tables 1 and 2. The evaluation standard "A" below is acceptable for practical use.

A: A glossiness of 250 or more.
B: A glossiness of 150 to less than 250.
C: A glossiness of less than 150.

TABLE 1

| | Materials | Example 1 | Example 2 | Example 3 | Example 4 | Example 5 | Example 6 | Example 7 | Example 8 | Example 9 |
|---|---|---|---|---|---|---|---|---|---|---|
| Pigment | Glitter pigment (in terms of solid content) | 1.20 | 1.20 | 1.20 | 1.20 | 1.20 | 1.20 | 1.20 | 1.20 | 1.20 |
| Solvent represented by Formula (1) | Solvent A | 10.00 | | | 10.00 | | | 10.00 | 10.00 | 10.00 |
| | Solvent B | | 10.00 | | | 10.00 | | | | |
| | Solvent C | | | 10.00 | | | 10.00 | | | |
| Alicyclic saturated hydrocarbon | Cyclooctane | | | | 20.00 | 20.00 | 20.00 | | | |
| | Cyclononane | | | | | | | 20.00 | | |
| | Cyclodecane | | | | | | | | 20.00 | |
| | Cyclododecane | | | | | | | | | 20.00 |
| Other solvents | γ-butyrolactone | | | | | | | | | |
| | N-methylpyrrolidone | | | | | | | | | |
| | 2-pyrrolidone | | | | | | | | | |
| | Tetraethylene glycol dimethyl ether | 20.00 | 20.00 | 20.00 | | | | | | |
| | Diethylene glycol diethyl ether | 68.47 | 68.47 | 68.47 | 68.47 | 68.47 | 68.47 | 68.47 | 68.47 | 68.47 |
| Resin | Cellulose acetate butyrate | 0.33 | 0.33 | 0.33 | 0.33 | 0.33 | 0.33 | 0.33 | 0.33 | 0.33 |
| | Total | 100.00 | 100.00 | 100.00 | 100.00 | 100.00 | 100.00 | 100.00 | 100.00 | 100.00 |
| Evaluation of printing properties | Abrasion resistance | B | B | B | A | A | A | A | A | A |
| | Printer ejection | A | A | A | A | A | A | A | A | B |
| Evaluation of storage stability (at room temperature and pressure for six months) | Rate of change in viscosity | A | A | A | A | A | A | A | A | A |
| | Glossiness | B | B | B | A | A | A | A | A | A |

TABLE 2

| | Materials | Comparative Example 1 | Comparative Example 2 | Comparative Example 3 | Comparative Example 4 | Comparative Example 5 | Comparative Example 6 |
|---|---|---|---|---|---|---|---|
| Pigment | Glitter pigment (in terms of solid content) | 1.20 | 1.20 | 1.20 | 1.20 | 1.20 | 1.20 |
| Solvent represented by Formula (1) | Solvent A | | | | | | |
| | Solvent B | | | | | | |
| | Solvent C | | | | | | |
| Alicyclic saturated hydrocarbon | Cyclooctane | | | | | | |
| | Cyclononane | | | | | 20.00 | |
| | Cyclodecane | | | | | | 20.00 |
| | Cyclododecane | | | | | | |
| Other solvents | γ-butyrolactone | | 10.00 | | | | |
| | N-methylpyrrolidone | | | 10.00 | | | |
| | 2-pyrrolidone | | | | 10.00 | | |
| | Tetraethylene glycol dimethyl ether | 20.00 | | | | | |

TABLE 2-continued

| | Materials | Comparative Example 1 | Comparative Example 2 | Comparative Example 3 | Comparative Example 4 | Comparative Example 5 | Comparative Example 6 |
|---|---|---|---|---|---|---|---|
| | Diethylene glycol diethyl ether | 78.47 | 88.47 | 88.47 | 88.47 | 78.47 | 78.47 |
| Resin | Cellulose acetate butyrate | 0.33 | 0.33 | 0.33 | 0.33 | 0.33 | 0.33 |
| | Total | 100.00 | 100.00 | 100.00 | 100.00 | 100.00 | 100.00 |
| Evaluation of printing properties | Abrasion resistance | C | C | C | C | C | C |
| | Printer ejection | A | A | A | A | A | A |
| Evaluation of storage stability (at room temperature and pressure for six months) | Rate of change in viscosity | A | B | C | C | A | A |
| | Glossiness | B | B | — | — | B | B |

3.4.4. Evaluation Results

According to Examples 1 to 9, the solvent represented by Formula (1) is used and therefore the metallic images recorded on the recording media are excellent in abrasion resistance.

According to Examples 4 to 9, the solvent represented by Formula (1) is used in combination with alicyclic saturated hydrocarbons and therefore the metallic images have particularly increased abrasion resistance. According to Examples 4 to 9, the nonaqueous ink compositions have better storage stability as compared with those prepared in Examples 1 to 3, in which no alicyclic saturated hydrocarbon is used.

According to Comparative Examples 1 to 6, the nonaqueous ink compositions containing solvents usually used are used and therefore the metallic images recorded on the recording media are not excellent in abrasion resistance. According to Comparative Examples 1 to 6, the nonaqueous ink compositions have poor storage stability; hence, no good metallic images were obtained and it was difficult to eject the nonaqueous ink compositions from a recording head of the ink jet printer.

The invention is not limited to the above embodiments and various modifications can be made. The invention covers, for example, configurations such as configurations substantially equivalent in function, process, and result to or configurations substantially equivalent in purpose and effect to those described in the embodiments. The invention covers configurations formed by replacing nonessential portions of the configurations described in the embodiments with others. The invention covers configurations capable of providing the same advantages as those of the configurations described in the embodiments or capable of achieving the same objects as those of the configurations described in the embodiments. Furthermore, the invention covers combinations of the configurations described in the embodiments and known techniques.

What is claimed is:

1. A nonaqueous ink composition for ink jet recording, containing:
  a glitter pigment, wherein particles of the glitter pigment are tabular with an average thickness of 5-100 nm;
  a solvent represented by the following formula:

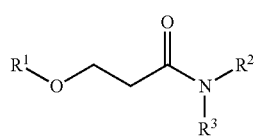

(1)

wherein $R^1$ represents an alkyl group containing one to eight carbon atoms and $R^2$ and $R^3$ represent a methyl group or an ethyl group; and
  an alicyclic saturated hydrocarbon,
  wherein the glitter pigment is present in the nonaqueous ink composition in an amount between 0.5 and 2.0% by mass, the solvent is present in the nonaqueous ink composition in an amount between 2 and 50% by mass, and the alicyclic saturated hydrocarbon is present in the nonaqueous ink composition in an amount between 10 and 25% by mass.

2. The nonaqueous ink composition according to claim 1, wherein the glitter pigment is made of aluminum or an aluminum alloy.

3. The nonaqueous ink composition according to claim 1, wherein the alicyclic saturated hydrocarbon contains eight to 12 carbon atoms.

4. The nonaqueous ink composition according to claim 1, wherein the alicyclic saturated hydrocarbon is at least one selected from the group consisting of cyclooctane, cyclononane, cyclodecane, cycloundecane, and cyclododecane.

5. The nonaqueous ink composition according to claim 1, wherein the 50% average particle size of the glitter (R50) is in the range of 0.5 to 3 μm and R50/Z is greater than 5, wherein Z is particle thickness.

6. An ink jet recording method comprising:
  ejecting droplets of the nonaqueous ink composition according to claim 1; and
  applying the droplets to a recording medium to record an image on the recording medium.

7. An ink jet recording method comprising:
  ejecting droplets of the nonaqueous ink composition according to claim 2; and
  applying the droplets to a recording medium to record an image on the recording medium.

8. An ink jet recording method comprising:
  ejecting droplets of the nonaqueous ink composition according to claim 3; and
  applying the droplets to a recording medium to record an image on the recording medium.

9. An ink jet recording method comprising:
  ejecting droplets of the nonaqueous ink composition according to claim 4; and
  applying the droplets to a recording medium to record an image on the recording medium.

* * * * *